Dec. 13, 1927.

T. THOMSEN, SR., ET AL 1,652,332

UNIVERSAL GRATE BAR MOLDING MACHINE

Filed March 6, 1926   2 Sheets-Sheet 1

Inventor:

Theodor Thomsen, senior.
Theodor Thomsen, junior.

Dec. 13, 1927.

T. THOMSEN, SR., ET AL 1,652,332

UNIVERSAL GRATE BAR MOLDING MACHINE

Filed March 6, 1926     2 Sheets-Sheet 2

Inventor:

Theodor Thomsen, senior.
Theodor Thomsen, junior.

Patented Dec. 13, 1927.

1,652,332

UNITED STATES PATENT OFFICE.

THEODOR THOMSEN, SR., AND THEODOR THOMSEN, JR., OF WITTORF, NEAR NEU-MUNSTER, GERMANY.

UNIVERSAL GRATE-BAR-MOLDING MACHINE.

Application filed March 6, 1926, Serial No. 92,836, and in Germany May 25, 1925.

This invention relates to a machine for molding grate bars and has for its principal object to provide an improved machine capable of molding a plurality of grate bars automatically in one operation.

A particular object of the invention is to provide a machine in which a number of molds for grate bars of different sizes are made automatically without any skilled attention being necessary to ensure accurate levelling of the molds.

A further object of the invention is to provide a machine in which the molds are made in a sand bed and are firmly pressed into shape so as to enable perfect grate bars having sharp edged corners to be produced by the casting operation.

An embodiment of the invention is shown, by way of example, in the accompanying drawings, in which—

Figure 1:
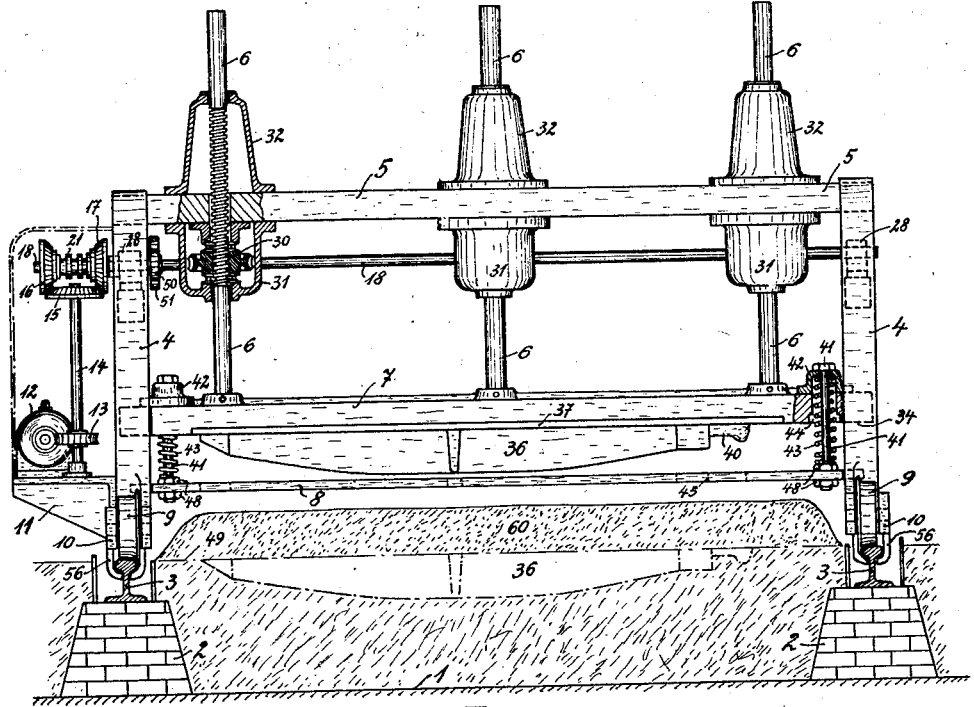
Fig. 1 shows the grate-bar molding machine in front elevation, the pressing plate being shown in raised position.
Figure 2:
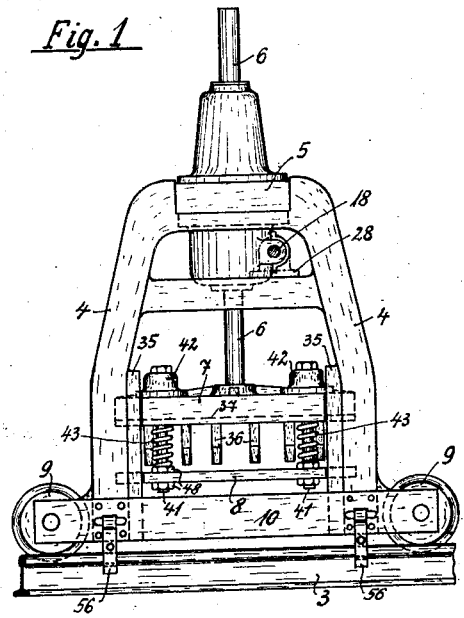
Fig. 2 is a side elevation of the molding machine.
Figure 3:
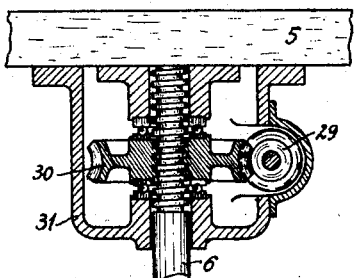
Fig. 3 shows the worm-drive for the columns of the pressing plate.

On the floor 1 of the foundry two stable longitudinal walls 2 of concrete or other convenient material are erected at a distance corresponding to the width of the molding machine. On these walls rails 3 are fixed in an accurately horizontal plane so that the molding machine running on the same is permanently in horizontal position.

The grate-bar molding machine consists essentially of two side frames 4 rigidly connected together by a strong transverse bar 5 and of a pressing plate 7 which is securely fixed to three columns 6 and to which the follower plate 8 is connected. In the lower ends of the side frames 4 running wheels 9 are mounted at such distance apart viewed in the direction of travel that the pressing plate and the follower plate can freely pass between the same. A bar 10 on the outer side of each side frame 4 serves to stiffen these frames and to afford a better mounting for the running wheels.

Figure 4:
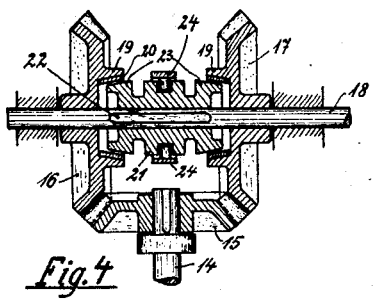
Fig. 4 shows a worm drive with reversible friction coupling.

On one of the side frames 4 a bracket 11 is fixed on which is mounted a motor 12 from which by worm and wormwheel 13 a vertical shaft 14 is rotated which carries on its upper end a bevel wheel 15. The bevel wheel 15 gears with two bevel wheels 16, 17 loosely mounted on a shaft 18 and rotating in opposite directions (Fig. 4). The bevel wheels 16 and 17 have each a conically turned ring 19 each ring having a lining 20 of red bronze or similar soft friction material. Between the two bevel wheels 16 and 17 a friction clutch member 21 is mounted so that it can shift on shaft 18 in longitudinal direction, said clutch member being coupled with the shaft by groove and key connection 22. The clutch 21 has at either side conical ends 23 which accurately fit into the conical rings 20 of the bevel wheels. By shifting the clutch member one of the conical ends 23 can be pressed into the corresponding ring 20 of the bevel wheel 16 or 17 so that the clutch and through it the shaft 18 is rotated from the corresponding bevel wheel. The shifting of clutch 21 is effected by means of a two-armed lever 24 pivotally mounted on a pin 25 and engaging with its forkshaped end into a ring groove 26 of the clutch the other end of said lever having a handle 27. When the lever 24 is in the central position $m$ (Fig. 5) the clutch is not in engagement with either of the bevel wheels 16 and 17. The positions $h$ and $n$ of the lever 24 correspond to the raising and lowering of the pressing plate 7. An automatic disengaging mechanism which will be hereinafter described effects the disengaging of the clutch at the correct time as soon as the pressing plate 7 has arrived at the lowest or highest admissible position.

The shaft 18 journalled in two or more bearings 28 is designed to operate the pressing plate 7, i. e. to move the same up and down. With this object in view three worms 29 are arranged on shaft 18 which gear with worm wheels 30. The worm wheels 30 are each mounted in a cage 31 on balls and have each a square threaded bore mounted on one of the square threaded columns 6 to which the plates 7 and 8 are fixed which are thus moved down and up. The columns 6 extend through the transverse bar 5, the threads being protected against dust by casings 32 on the bar 5. The thread in each column extends only so far that it does not project from the corresponding casing 32 when the pressing plate 7 is in the raised position. The smooth upper end of the columns 6 is of such length that it slightly projects from the corresponding casing 32 when the pressing plate 7 is in the lowest position, the columns being thus permanently well guided. The lower ends of the columns are rigidly fixed on the pressing plate 7, said plate being preferably made from cast steel and having a number of apertures 33 to reduce the weight.

Two extensions 34, one at each short side serve to properly guide the pressing plate 7 between bars 35 fixed on the side frames 4.

Figure 9:
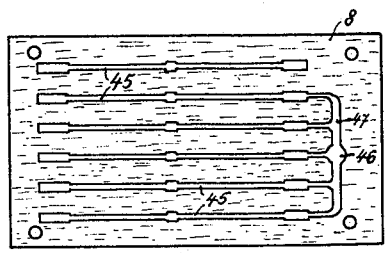
Figs. 9 and 10 show two follower plates respectively for one row and three rows of grate-bars.
Figure 10:
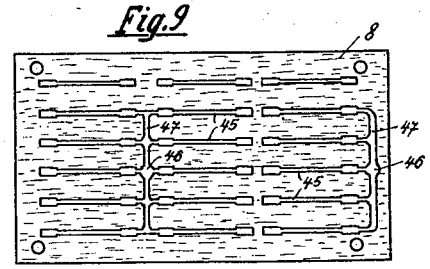
Figure 8:
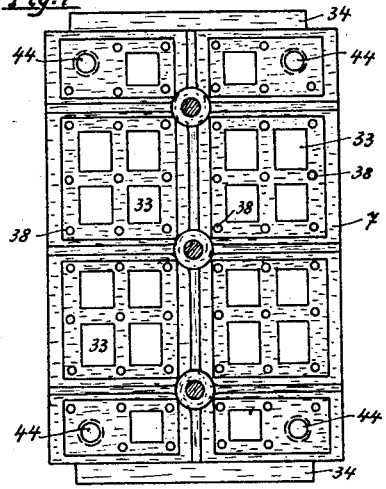
Fig. 8 is a top plan view of the pressing plate.

On the lower surface of the pressing plate 7 a convenient number of grate-bar patterns 36 are fixed, as shown in Fig. 9 of the drawing six patterns and as shown in Fig. 10 three rows each of six patterns. The patterns 36 are preferably fixed on a common plate 37 (corresponding in plan view to Figs. 9 or 10) so that the patterns can be accurately adjusted outside the machine. This common plate 37 is then fixed on the lower surface of the pressing plate 7 which has a number of screw holes 38 for the screws designed to fix plate 37. In the lower surface of the pressing plate 7 a special aperture 39 may be arranged designed to receive the pattern plate 37 so that no special adjusting is necessary. Special thickenings 40 (Fig. 1) on the pattern plate 37 serve to produce the inlets and connecting channels.

Underneath the pressing plate 7, at a convenient distance from the same, a follower plate 8 is arranged so that it can be moved in vertical direction. The follower plate is guided between the bars 35 of the side frames 4. The follower plate is mounted on four bolts 41 which pass freely through holes in the pressing plate and are held at their upper ends in casings 42 fixed on the pressing plate, the follower plate being fixed on the lower end of each bolt by two nuts 48. Spiral springs 43 each wound around the corresponding bolt are inserted between the pressing plate and the follower plate so that the latter is permanently pressed away from the pressing plate. When the pressing plate 7 descends the follower plate 8 rests upon the mold bottom and the pressing plate comes gradually closer to said follower plate at the same time compressing the spiral springs 43 which are accommodated in the casings 42 and in the bores 44 in the pressing plate, the bolts 41 projecting from the casings 42. According to the arrangement and size of the grate bar patterns on the pressing plate apertures 45 are arranged in the follower plate through which the grate bar patterns 36 pass and further apertures 46 or 47 for the inlets and for the connecting channels.

The horizontal plane 49 in which the upper ends of the rails 3 are situated is the limit of the downward stroke of the machine so that the plates used during the casting of the grate bars can rest upon said rails 3. The upper surfaces of the cast grate bars will then be all in the same plane as indicated in Fig. 1, in dot and dash lines.

Figure 5:
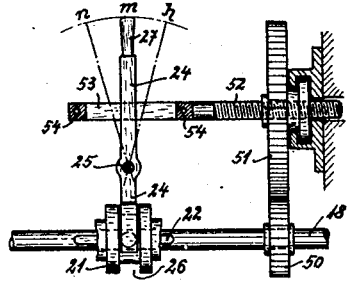
Fig. 5 shows the mechanism for automatically disengaging the worm shaft at the highest and lowest position of the pressing plate.
Figure 7:
Fig. 7 shows the pressing plate in cross section.

In order to stop the movement of the pressing plate automatically at the highest and lowest position of said plate an automatically acting disengaging device for the clutch member 21 is arranged (Fig. 5).

The automatic effect of this device consists in that a toothed wheel 50 keyed on shaft 18 drives a toothed wheel 51 having a threaded bore. By the thread of this bore a spindle 52 is screwed in or out according to the direction of rotation. The end 53 of the spindle is flat and serves as support for the lever 24. On this flat end 53 of spindle 52 two stops 54 are adjustably mounted at such a distance the one from the other that when the pressing plate 7 is in the highest or lowest position, they bear against the lever 24 and bring the same into the central position $m$ so that the clutch is disengaged from both bevel wheels 16 and 17. As the stops are adjustable the stroke can be regulated at will. The disengaging mechanism might be of any other convenient type as it forms no part of the invention.

Figure 6:
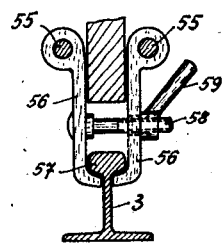
Fig. 6 illustrates the stopping mechanism for the molding machine.

For fixing the grate-bar molding machine in any desired position on the rails 3 a pair of clamping jaws 56 is hingedly mounted on each side frame 4 said clamping jaws being pivotable around axles 55 (Fig. 6) and gripping over the heads 57 of the rails 3. By a toggle screw 58 and a nut 59 having a handle the clamping jaws can be strongly pressed against the rails so that the molding machine is securely held on the rails in its actual position.

The operation of the grate-bar molding machine is as follows:—

The surface of the sand bed on the floor designed for the molding is prepared in the usual manner and a layer 60 of fine sand is heaped on this surface. Over this heap 60 the molding machine is brought and fixed in position by means of the clamping jaws 56. The plate 37 with the grate-bar patterns and the corresponding follower plate 8 having been mounted on the pressing plate 7 the machine is started by means of lever 24 so that the pressing plate 7 with the patterns descends. The follower plate 8 comes first in contact with the layer of sand 60 and is thus stopped. The pressing plate 7 continues to descend and pushes the patterns 36 through the apertures 45, 46 and 47 of plate 8 and into the layer of sand 60. After the pressing plate 7 has come in contact with plate 8 the two plates continue to descend together to the horizontal plane 49, the sand being strongly compressed. The clutch 21 has now to be disengaged by hand or is disengaged automatically by the action of the automatic disengaging device (Fig. 5).

In order to pull the patterns out of the sand the clutch member 21 is engaged so that the pressing plate ascends. (Engaging of the clutch in opposite direction would not be possible as lever 24 is blocked by one of the stops 54 when the pressing plate 7 is in the lowest position.) When plate 7 ascends the plate 8 remains at rest owing to its weight and to the pressure of springs 43 until the patterns 36 have been pulled through plate 8 which is then raised by the bolts 41. This remaining at rest of plate 8 is very important as otherwise the edges of the molds would break off when the patterns are withdrawn.

The machine shown by way of example holds six grate bars. If the machine is moved on the rails 3 the extreme grate bar patterns will come in engagement with the end mold of the six molds which have last been formed and will prevent destruction of the last molds during the fresh molding.

We claim:—

1. A transportable molding machine for molding grate bars without the use of molding boxes directly and continuously in the sand bed of the foundry, comprising in combination threaded columns, worm wheel gears for rotating said threaded columns, a pressing plate fixed to said columns and holding the patterns a follower plate underneath said pressing plate, two vertical side frames mounted on running wheels directly upon the sand bed of the foundry, and means for locking said frames at any point in the foundry.

2. A transportable molding machine for molding grate bars without the use of molding boxes directly and continuously in the sand bed of the foundry, comprising in combination threaded columns, worm wheel gears for rotating said threaded columns, a pressing plate fixed to said columns, smooth plate removably fixed to the lower surface of said pressing plate so that the patterns for the grate bars can be fixed on said smooth plate outside the machine, a follower plate underneath said pressing plate, two vertical side frames mounted on running wheels directly upon the sand bed of the foundry, and means for locking said frames at any point on the rails.

3. A transportable molding machine for molding grate bars without the use of molding boxes directly and continuously in the sand bed of the foundry, comprising in combination threaded columns, worm wheel gears for rotating said threaded columns, a pressing plate fixed to said columns, guide bolts guided in said pressing plate, a smooth plate removably fixed to the lower surface of said pressing plate so that the patterns for the grate bars can be fixed on said smooth plate outside the machine, a follower plate fixed to said guide bolts, a spiral spring wound around each guide bolt between the lower surface of said smooth plate and the top surface of said follower plate, two vertical side frames mounted on running wheels directly upon the sand bed of the foundry, and means for locking said frames at any point in the foundry.

In testimony whereof we affix our signatures.

THEODOR THOMSEN, Senior.
THEODOR THOMSEN, Junior.